April 29, 1958   A. HERTZBERG ET AL   2,832,665
METHOD AND APPARATUS FOR CARRYING OUT GAS PHASE REACTIONS
WHICH REQUIRE A HIGH TEMPERATURE TO PROMOTE THE REACTION
AND RAPID COOLING TO PRESERVE THE REACTION PRODUCT
Filed Dec. 23, 1954   3 Sheets-Sheet 1
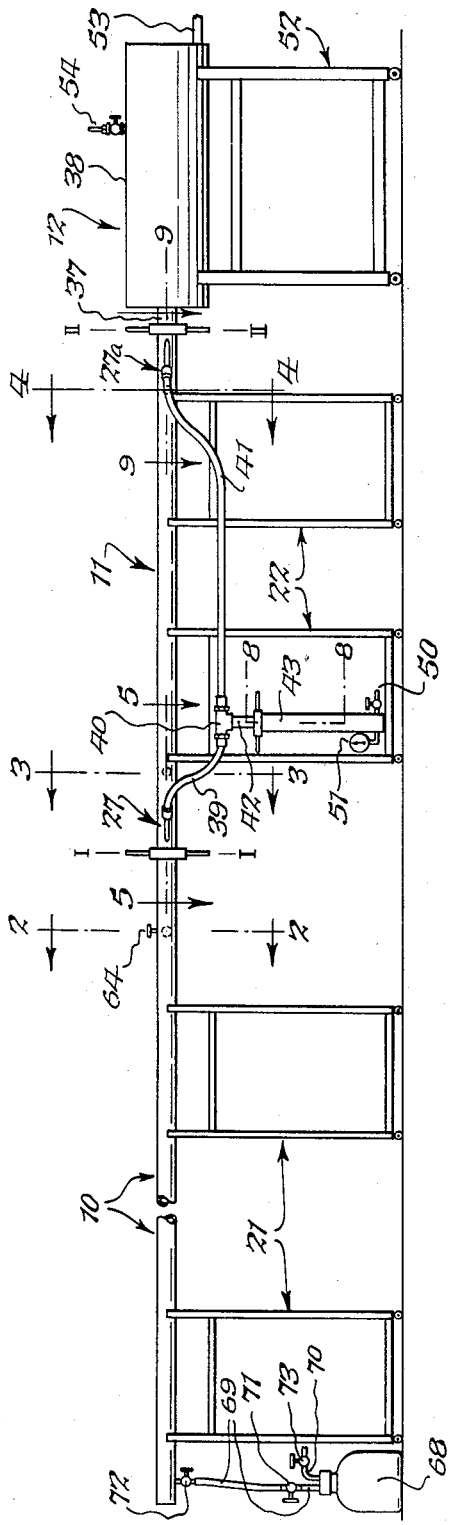
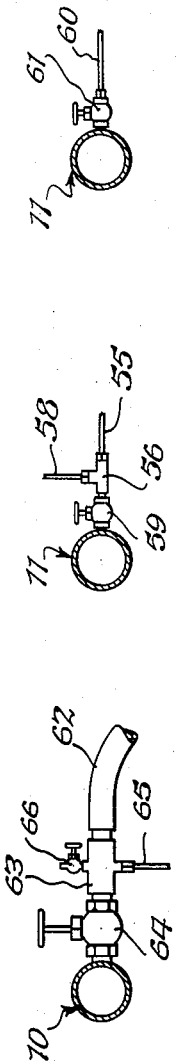
INVENTORS
Abraham Hertzberg
Herbert S. Glick
William Squire
by Popp and Sommer
Attorneys.

April 29, 1958     A. HERTZBERG ET AL     2,832,665
METHOD AND APPARATUS FOR CARRYING OUT GAS PHASE REACTIONS
WHICH REQUIRE A HIGH TEMPERATURE TO PROMOTE THE REACTION
AND RAPID COOLING TO PRESERVE THE REACTION PRODUCT
Filed Dec. 23, 1954     3 Sheets-Sheet 2
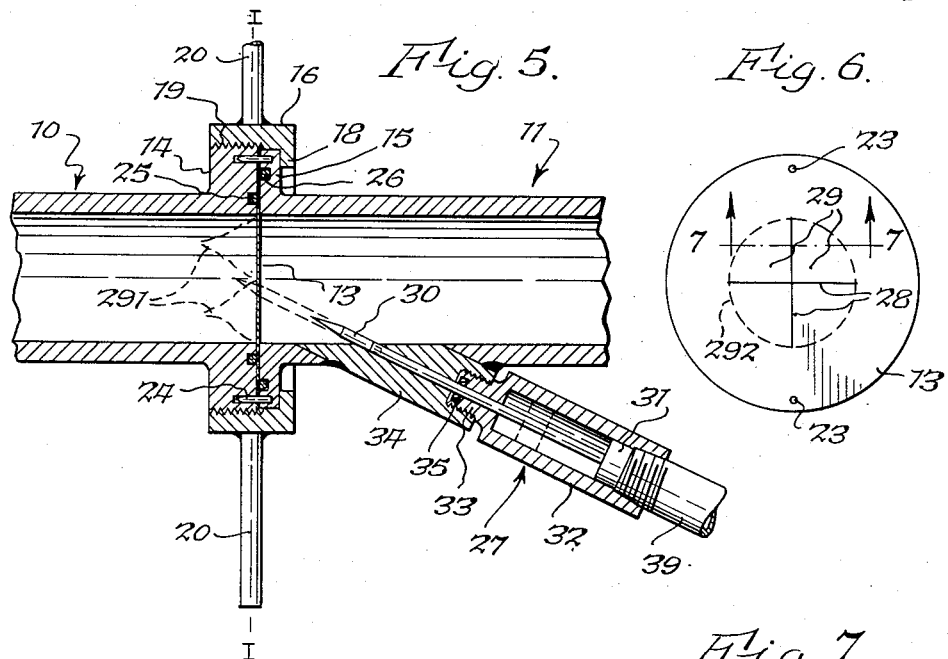
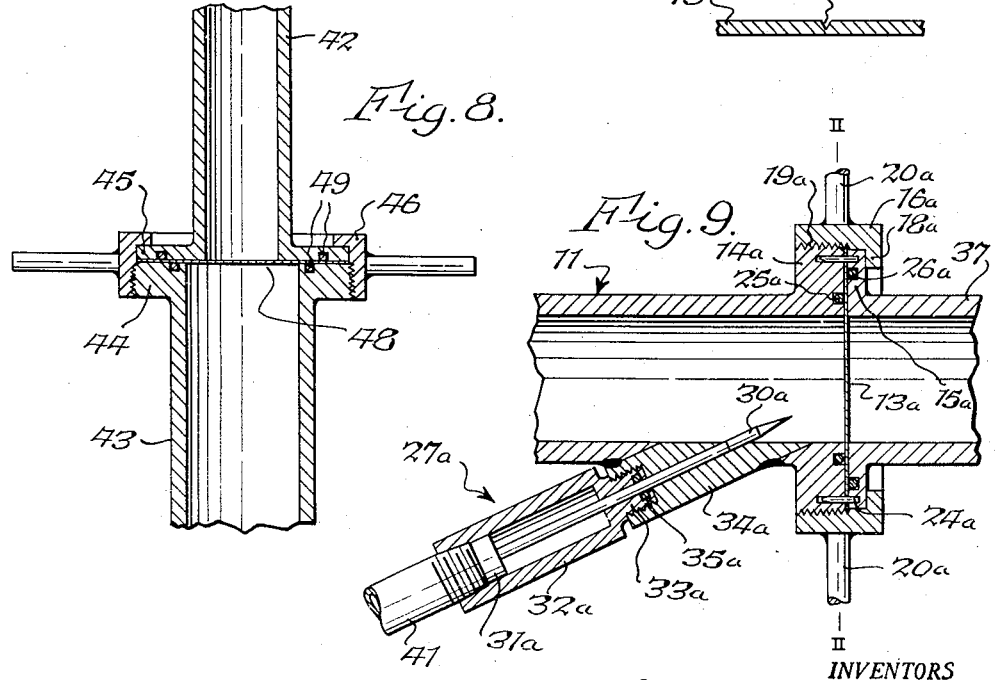
INVENTORS
Abraham Hertzberg
Herbert S. Glick
William Squire
by Popp and Sommer
Attorneys.

United States Patent Office 2,832,665
Patented Apr. 29, 1958

2,832,665

METHOD AND APPARATUS FOR CARRYING OUT GAS PHASE REACTIONS WHICH REQUIRE A HIGH TEMPERATURE TO PROMOTE THE REACTION AND RAPID COOLING TO PRESERVE THE REACTION PRODUCT

Abraham Hertzberg, Buffalo, Herbert S. Glick, Eggertsville, and William Squire, Buffalo, N. Y., assignors to Cornell Aeronautical Laboratory, Inc., Buffalo, N. Y., a corporation of New York Application December 23, 1954, Serial No. 477,158

14 Claims. (Cl. 23—1)

This invention relates to a method and apparatus for carrying out gas phase reactions which require a high temperature to promote the reaction and rapid cooling to preserve the reaction product. While the invention has general application to all suitable gas phase reactions, it will be illustrated and desscribed particularly in connection with the fixation of atmospheric nitrogen.

If air containing molecular nitrogen and oxygen is heated to a very high temperature, a small percentage of nitric oxide (NO) is formed according to the reaction:

$$N_2 + O_2 \rightleftharpoons 2NO$$

The equilibrium percentage "fixed" is a function of temperature; the higher the temperature, the more NO formed before disassociation. If the hot gas is cooled very rapidly, the NO does not have time to decompose and the high temperature equilibrium is frozen. The more rapid the cooling the higher the yield of NO.

Heretofore, two processes have actually been used for nitrogen fixation, one being the electric arc process and the other being a process using pebble furnaces. In the arc process, the air is heated to a high temperature (3600° K.) by the electric arc. The hot air is cooled by mixing with cold air, which is a relatively slow process and reduces the yield of the NO. In the other process, the heating is by combustion of preheated air in a pebble furnace and the cooling is by heat transfer to the pebbles. Cooling a gas by contact with a solid surface is also relatively slow and the operating temperature is limited by the construction materials. Moreover, the yield of NO is reduced by the consumption of oxygen for combustion. Both of such prior processes give a low yield of NO and require large extraction facilities.

The general objective of the present invention is to circumvent these difficulties by using non-steady pressure waves to effect large temperature changes very rapidly. The basic phenomena associated with non-steady waves can be understood by considering a region of high pressure gas separated from a region of low pressure gas by a partition. If the partition is removed, the pressure will tend to equalize, but this cannot take place instantaneously. Instead, pressure waves propagate through the gas to establish the final equilibrium. The equilibrium is approached through violent oscillations involving intermediate temperatures higher than the initial ones before removal of the partition. The apparatus providing the two regions separated by a partition is known as a shock tube.

According to the practice of the present invention, two types of pressure waves are involved, compression waves which raise the pressure and temperature, and expansion waves which decrease them. The compression waves travel faster than the speed of sound and are known as shock waves. The strength of a shock wave is measured by its Mach number, which is the velocity of the shock wave, divided by the speed of sound in the gas into which the shock wave is moving. In a shock tube of the type referred to above, the factors which determine the speed of travel of a shock wave, and hence its strength, are the pressure ratio and speed of sound ratio between the two regions on opposite sides of the partition. The shock wave is a discontinuity for practical purposes, but the expansion waves fan out and the cooling rate decreases as the distance from the origin increases. Therefore, by using wave processes, a volume of gas can be rapidly heated and cooled relatively uniformly.

It is accordingly the primary objective of the present invention to provide a method and apparatus for carrying out gas phase reactions by subjecting a volume of reactant gas to the action of shock and expansion waves so that the reactant gas is rapidly and uniformly heated to a sufficiently high temperature to form the desired reaction product and to rapidly and uniformly cool the gas to prevent decomposition of the reaction product, and all under circumstances where there is precise control of the temperature and the duration of the heating and cooling effects.

The practice of the present invention has general applicability to all suitable gas phase reactions where it is desired to produce a small quantity of reaction product, such as for laboratory purposes or where only a small quantity of reaction product is needed and which may be difficult, if not impossible, to produce otherwise.

Other objects and advantages of the invention will be apparent from the following description and accompanying drawings in which:

Fig. 1 is an elevational view of one side of apparatus constructed in accordance with the present invention and adapted to carry out the method forming one aspect of the invention.

Figs. 2, 3 and 4 are enlarged, vertical, transverse, sectional views taken on the correspondingly numbered lines of Fig. 1.

Fig. 5 is an enlarged, fragmentary, horizontal, sectional view through the left hand diaphragm puncturing means shown in Fig. 1 and taken on line 5—5 thereof.

Fig. 6 is an enlarged view of one face of the diaphragm shown in Fig. 5.

Fig. 7 is an enlarged, fragmentary, sectional view thereof, taken on line 7—7 of Fig. 6.

Fig. 8 is an enlarged, fragmentary, vertical sectional view through a part of the apparatus shown in Fig. 1, this view being taken on line 8—8 thereof.

Fig. 9 is an enlarged, fragmentary, horizontal sectional view through the right hand diaphragm puncturing means shown in Fig. 1 and taken on line 9—9 thereof.

Figure 10:
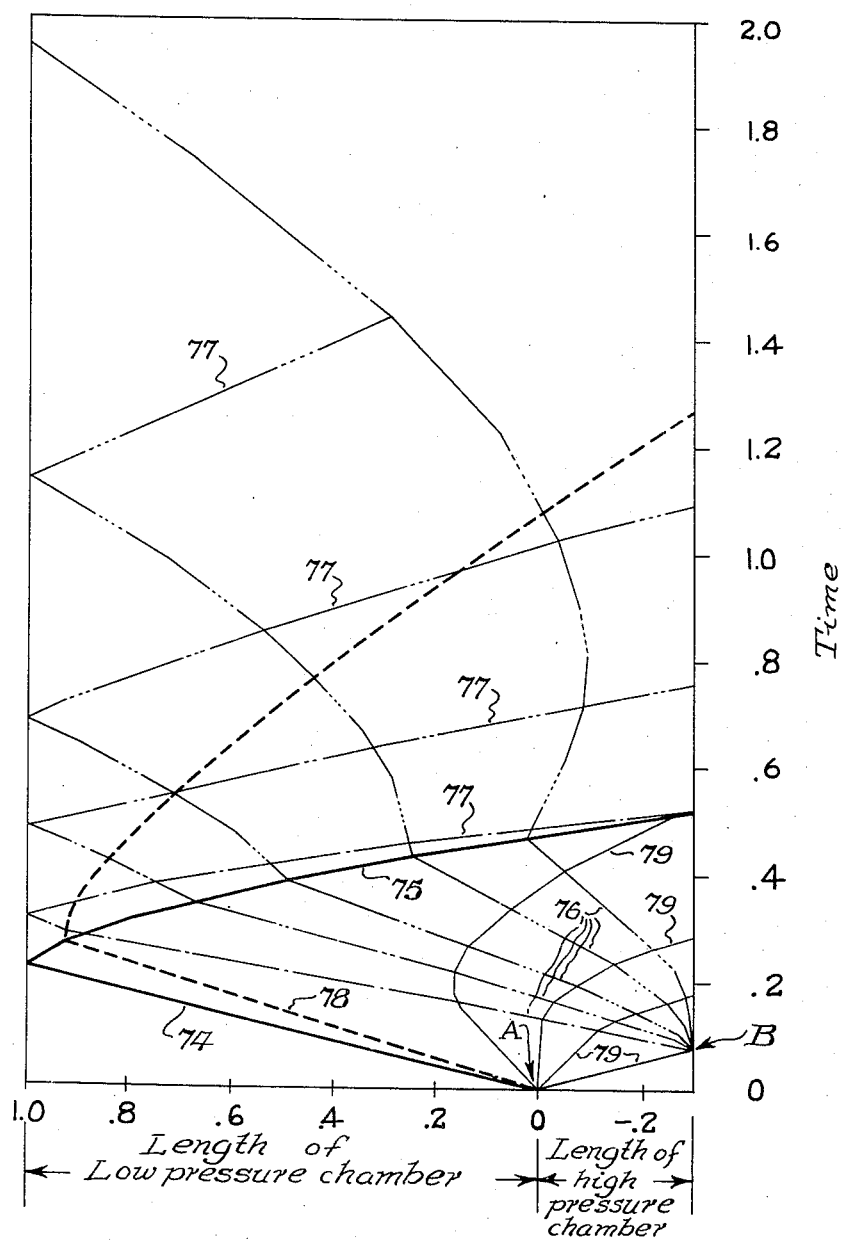
Fig. 10 is a diagram illustrating the interaction of the shock and expansion waves in the operation of the apparatus shown in Fig. 1.

In accordance with the invention, the apparatus is shown as including a shock tube having a low pressure section 10, a high pressure section 11 and a vacuum section 12. The low and high pressure sections are separated by a rupturable diapraghm 13 shown in Fig. 5, and a similar diaphragm 13a shown in Fig. 9 separates the high pressure section 11 from the vacuum section 12. Referring to Fig. 1, the diaphragm separating the high and low pressure sections 10 and 11 is at the location represented by the line I—I, and the similar diaphragm between the high pressure section and the vacuum section 12 is arranged at the location represented by the line II—II. The high pressure section 11 contains a low molecular weight, inert gas such as helium, sometimes hereinafter referred to as the driver gas or driver. Hydrogen gas may be used as the driver in some processes where it will not affect the reaction. The low pressure section 10 contains the gas or gases to be reacted, sometimes hereinafter referred to as the reactant gas or reactant, which is subjected to a predetermined action of shock and expansion waves produced by rupturing the two diaphragms 13 and 13a in proper timed sequence. In the nitrogen fixation process herein specifically described, the reactant is air.

While the shock tube comprised of the various sections 10, 11 and 12 may be constructed in any suitable manner, as shown, the low and high pressure sections 10 and 11, respectively, are made of linear cylindrical metal tubing of the same diameter and arranged coaxially with their meeting ends preferably separably joined together in the manner disclosed in Fig. 5. As there shown, the end of the section 10 is formed with a radially outwardly extending annular flange 14 having a thickness in an axial direction several times the wall thickness of the tube 10. In a somewhat similar manner, the end of the high pressure section 11 is formed with a radially outwardly extending annular flange 15 but this flange has a thickness in an axial direction about the same as the wall thickness of the tube 11. The opposing faces of the flanges 14 and 15 are flat and adapted to be drawn together by a collar 16 having an inturned annular flange 18 arranged on the inner side of the flange 15 and adapted to bear thereagainst. The internal surface of the cylindrical collar 16 adjacent the end thereof opposite from the inturned flange 18 is provided with internal threads adapted to engage with the male threads provided on the periphery of the flange 14. The threaded connection between the collar 16 and the flange 14 is indicated at 19. Turning of the collar 16 is facilitated by the handles 20 extending radially outwardly from the periphery of the collar 16 and the inner ends of these handles may be secured to the collar in any suitable manner as by being welded thereto.

It will be seen that by turning the collar 16 in one direction, the flanges 14 and 15 on the respective tubes 10 and 11 can be drawn tightly together and by turning the collar in the opposite direction, the collar can be completely unscrewed from engagement with the flange 14 and thereby disconnect the tubes 10 and 11 and permit of their physical displacement or separation in an axial direction in order to replace the diaphragm 13 at the location I—I.

In connection with moving the sections 10 and 11 axially apart, the section 10 is shown as supported on wheeled stands 21 which may be of any suitable construction, and the section 11 is shown as similarly supported on wheeled stands 22, as shown in Fig. 1.

Referring again to Fig. 5, the diaphragm 13 is shown as arranged between the tubes 10 and 11. The diaphragm 13 is a circular disc of thin sheet material, so that its marginal portion is clamped between the opposing surfaces of the flanges 14 and 15 on the respective tubes 10 and 11. The diaphragm 13 is shown as provided with a pair of diametrically opposed small holes 23, each of which is adapted to receive a dowel pin 24 shown as projecting axially outwardly from the outer face of the flange 15 into a registered recess provided in the opposing face of the flange 14. Thus, the dowel pins 24 serve not only to position the diaphagm 13 with respect to the flanges 14 and 15, but also to position these flanges themselves preparatory to tightening the coupling collar 16. Leakage outwardly along the opposing surfaces of the diaphragm 13 is prevented by suitable sealing means. As shown, an O-ring 25 is arranged in an annular groove in the face of the flange 14 and a similar O-ring 26 is arranged in an annular groove in the face of the flange 15 but having a larger diameter than that accommodating the O-ring 25. These O-rings bear against the opposing faces of the diaphragm 13 along circular lines at different distances from the common longitudinal axis of the tubes 10 and 11 and serve effectively to prevent the leakage of reactant and driver from the interiors of the tubes 10 and 11 radially outwardly past these annular sealing lines.

The diaphragm 13 at the location I—I is preferably formed of hardened aluminum and also, preferably on that side which faces the low pressure section 10, is scored to facilitate the rupture or opening of the diaphragm. As shown in Figs. 6 and 7, the scoring takes the form of crossed narrow grooves 28 which intersect at the center of the diaphragm and each groove has a length corresponding to the internal diameter of the tubes 10 and 11. The crossed score lines or grooves 28 define the radial sides of four sector-shaped sections 29 which form potential flaps adapted to be turned axially inwardly of the tube 10 as hereinafter described.

Any suitable means may be provided for rupturing the diaphragm 13. The preferred means is represented generally by the numeral 27 and as shown in Fig. 5 comprises a pointed plunger 30 which is arranged at one side of the tube 11 and at an angle to the axis thereof but adjacent the diaphragm 13 so that this plunger may be forcefully projected from its retracted inoperative position, shown by full lines in Fig. 5, to its projected operative position, also illustrated in this figure but by dotted lines, which will operate to puncture the diaphragm 13 at about its center and initiate the tearing of the sector-shaped sections 29 along the grooves or cross lines 28 (Fig. 6). The pressure of the driver gas in the high pressure section 11 completes the tearing of the sectors 29 along the lines 28 and causes them to form the flaps 291 which bend along the line 292 (Fig. 6) into the low pressure section 10 and lie against the inner surface of the wall thereof, as illustrated by dotted lines in Fig. 5.

At its rear or outer end, the plunger 30 is shown as enlarged to provide a piston head 31 which is slidingly arranged in a cylinder 32. This cylinder 32 at its forward end is shown as having an outwardly projecting axial neck 33 which is externally threaded and screwed into an internally threaded recess provided in an adapter 34. The adapter 34 is shown as a boss on the wall of the tube 11, being formed by an insert in the wall and welded thereto. The adapter 34 has a cylindrical passage centrally thereof through which the plunger 30 extends and the neck 33 of the cylinder 32 likewise has an axial passage accommodating the plunger. A seal around the plunger is provided by an O-ring 35 arranged in an internal annular groove in the neck 33.

The vacuum section 12 includes a short tube 37, which is of the same diameter and wall thickness possessed by the tube 11, and also includes an enlarged cylindrical tank 38 arranged to the right of the tube 11 as viewed in Fig. 1 with their interiors in communication. The vacuum tank must be of sufficient size to prevent excessive final temperatures of the reactant gas. The tubes 11 and 37 have flanges and are connected together by a collar in the same manner as has been described for the tubes 10 and 11, except that the arrangement of the parts has been reversed. Accordingly, the separable connection between the tubes 11 and 37 is illustrated in Fig. 9 with similar parts identified by the same reference numerals except as distinguished by the suffix "a."

It is to be understood that the diaphragm 13a at the location II—II and serving as a partition between the high pressure section 11 and the vacuum section 12, is identical with the diaphragm 13 described at the location I—I, except that the diaphragm 13a and its puncturing means 27a at the location II—II are reversed from those shown at the location I—I. That is, at the location II—II, the diaphragm 13a is arranged so that its scored side faces the vacuum section 12 and the means 27a for rupturing the diaphragm 13a, are arranged to the left of this diaphragm instead of to the right as shown in Fig. 5. In other words, the diaphragm rupturing means for both diaphragms are arranged upon the intermediate tube section 11. The various parts of the rupturing means 27a shown in Fig. 9 have been identified by the same reference numerals as used for the rupturing means 27 shown in Fig. 5, except as distinguished by the suffix "a."

Means are provided for actuating the plungers 30 and 30a of the two diaphragm rupturing means 27 and 27a in a proper sequence and at a predetermined time interval. Various means may be employed for accomplishing this, the means shown being preferred and comprising, with reference to Fig. 1, a tube 39 of relatively short length connected at one end to the cylinder 32 of the left hand diaphragm rupturing means 27 and at its other end to a T 40, and a relatively longer tube 41 connected at one end to the opposite end of the T 40, and at its other end to the cylinder 32a of the right hand diaphragm rupturing means 27a. The third port of the T 40 is connected to a means for producing a shock wave of sufficient magnitude to divide and part of it pass through the short tube 39 to actuate the plunger 30 of the left hand diaphragm rupturing means 27 and the other part of the shock wave to pass through the longer tube 41 to actuate the plunger 30a of the right hand diaphragm rupturing means 27a.

The shock wave producing means for actuating the plungers are shown as comprising a vertical pipe 42 connected at its upper end to the said third port of the T 40. The lower end of such pipe 42 is removably connected to the upper end of a vessel 43. Referring to Fig. 8, the vessel 43 is shown as being a cylindrical pipe of slightly larger diameter than that of the upper pipe 42 and is closed at its lower end. The upper end of the vessel 43 is formed to provide a radially outwardly projecting annular flange 44, the upper face of which opposes the lower face of a radially outwardly projecting annular flange 45 provided on the lower end of the upper pipe 42. These flanges are adapted to be drawn together by a collar 46 having a threaded connection with the periphery of the thicker flange 44. The connection between the pipes 42 and 43 is similar to that described in greater detail with respect to the tubes 10 and 11 shown in Fig. 5 and the tubes 11 and 37 shown in Fig. 9. A diaphragm 48 is clamped between the opposing faces of the flanges 44 and 45 and the joint is sealed by suitable means such as the O-rings 49. Any suitable gas such as helium is adapted to be introduced into the vessel 43 through the valved inlet line 50 (Fig. 1) and the pressure built up within the vessel 43 can be read on the pressure gauge 51 connected to this vessel. The diaphragm 48 need not be scored as was discussed in connection with the diaphragms 13 and 13a. The gas is introduced into the vessel 43 through the line 50 until a sufficient pressure has been built up therein to break the diaphragm 48. Rupture of the diaphragm 48 generates a shock or pressure wave which passes upwardly through the pipe 42 into the T 40 where it divides and propagates laterally through the pipes 39 and 41. Because the pipe 39 is shorter in length than the pipe 41, the shock wave in the former will reach and move the piston head of the plunger 30 of the left hand diaphragm rupturing means 27 before the shock wave propagated through the longer tube 41 reaches and acts upon the piston head of the plunger 30a of the right hand diaphragm rupturing means 27a. By proportioning the relative lengths of the tubes 39 and 41, the order of rupture and the time interval between the rupturing of the two diaphragms 13 and 13a can be very accurately controlled.

Turning now to the vacuum section 12, the tank 38 and the tube 37 rigidly connected thereto are shown as being supported on a wheeled stand 52 so that the sections 11 and 12 can be separated to replace the diaphragm 13a at location II—II. The tank 38 is connected through the line 53 to any suitable means (not shown) for creating a vacuum in the section 12. The pressure within the section 12 can be determined by connecting the same with a manometer (not shown) through the valved line indicated at 54.

Means are provided for exhausting the high pressure section 11 and filling the same with a driver gas, such as helium, preparatory to operating the apparatus. While any suitable means for accomplishing these purposes may be employed, those shown in Figs. 3 and 4 have been found satisfactory.

Before introducing helium into the tube section 11, the gas within such tube is exhausted to the desired negative pressure through a line 55 shown in Fig. 3 which line, at one end, is connected to any suitable type of vacuum pump (not shown) and at the other end to one port of a T 56. Another port of this T 56 is shown as connected to a line 58 which leads to a manometer (not shown). The third port of the T 56 is shown as connected by a shutoff valve 59 to the tube 11. When the valve 59 is open and the vacuum pump (not shown) is operated, it will be seen that the gas within the tube 11 can be exhausted through the exhaust line 55 to the negative pressure desired as will be indicated on the manometer (not shown). The assembly just described is shown as arranged on the tube 11 adjacent the station I—I.

Adjacent the station II—II, the tube 11 is shown as having connected thereto the means for introducing the driver gas such as helium. Such means are shown in Fig. 4 and include a supply line 60 which leads from any suitable source of helium under pressure (not shown) to a shutoff valve 61 which, in turn, is shown as being connected to the tube 11. With the valve 61 open, helium can be introduced into the tube 11 through the line 16 and allowed to build up to the desired pressure, after which the valve is closed.

Means are also shown for exhausting the gas from the low pressure section and introducing the reactant gas such as air. Such means are shown as being connected to the tube 10 adjacent the station I—I and, as best shown in Fig. 2, include a line 62 connected at one end to one port of a cross fitting 63 and at its other end to a suitable vacuum pump (not shown). The opposite port of the cross fitting 63 is shown as being connected to the tube 10 through a main shutoff valve 64. The third port of the cross fitting 63 is shown as connected to a line 65 which leads to a manometer (not shown) which can be employed to measure the negative pressure within the tube 10. The fourth port of the cross fitting 63 is shown as connected to one end of a shut-off valve 66, the opposite end of this valve being open to the atmosphere. It will be seen that with the air inlet valve 66 shut off and the main line valve 64 open, the vacuum pump (not shown) connected to the exhaust line 62 can be operated to exhaust the gases from the tube 10 to the desired degree. After this has been done, the operation of the vacuum pump (not shown) is discontinued and the air inlet valve 66 opened to allow air to pass through this valve and into the tube 10, filling the same to the desired pressure which, as later described herein in connection with the operation of the apparatus, is preferably below atmospheric pressure. After the tube 10 has been filled with air to the desired pressure, the main line valve 64 can be shut off. The above described exhausting of the tube 10 and filling it with air to the desired pressure, is all performed to prepare the apparatus for effective use.

Referring to the left-hand end of Fig. 1, means are there shown for removing the reactant gas after it has been subjected to the driver gas. Such means may be variously constructed but as shown comprise a bottle 68 suitably stoppered and having an inlet line 69 and an outlet line 70. The inlet line 69 is shown as including a shutoff valve 71 and at its end remote from the bottle 68 is shown as connected to the outlet of a main shutoff valve 72 which has its inlet suitably connected to the interior of the low pressure tube 10 adjacent its outer or free end. The outlet line 70 is shown as having arranged therein a shutoff valve 73.

In preparing the apparatus for operation, the tube sections 10 and 11 are separated and reassembled with an imperforate diaphragm 13 as shown in Fig. 6 between the sections. In a similar manner, the sections 11 and 12 are separated and reassembled so as to place between them an imperforate diaphragm 13a. Following this, in any order desired, the various sections 10, 11 and 12 are prepared. The vacuum section 12 is exhausted and the desired negative pressure is established therein. Likewise as previously more fully described, the intermediate or high pressure section 11 is first exhausted of gas and then refilled with helium to the desired pressure. When the section 11 is being exhausted, the valve 61 controlling the supply of helium is, of course, shut off and when the exhaustion is completed and the helium is to be supplied into the tube 11, the exhaust line valve 59 is shut off. With respect to the low pressure section 10, the outlet valve 72 is shut off and the section is first exhausted of gas and then refilled with air to the desired pressure, after which the valve 64 is shut off.

The apparatus is now ready to be fired or operated. This is accomplished by opening the valve in the helium supply line 50 of the plunger actuating means. As previously described, the pressure is built up within the vessel 43 until the diaphragm 48 ruptures which thereupon generates a shock wave. Part of the shock wave reaches the piston head 31 by traveling through the shorter tube 39 before the other part of the shock wave impinges against the piston head 31a by traveling through the long tube 41. When the shock wave traveling through the shorter tube 39 impinges against the piston head 31, the plunger 30 is forcefully moved into and through the diaphragm 13, thereby rupturing the same and generating a shock wave produced by the sudden release of the high pressure driver gas, specifically helium maintained within the high pressure section 11, into the low pressure section 10 in which the reactant, specifically air, is confined. The shock wave so generated propagates through the air within the low pressure section 10 toward the closed end of this section, the same being the extreme left-hand end shown in Fig. 1. The action of the shock wave on the air within the section 10 is such as to raise the pressure and temperature of such air to an intermediate level. The shock wave travels through the air within the tube 10 along the full length thereof and strikes the closed end of such tube and is reflected thereby so that the reflected shock wave again passes through the air which has been partially compressed and whose temperature has been raised to an intermediate level, thereby further compressing the air and raising its temperature to a higher level. The temperature to which the air is subjected is sufficient to permit molecular oxygen and nitrogen within the air to react to form nitric oxide (NO).

The second diaphragm 13a is ruptured or broken by its plunger 30a so as to generate expansion waves which propagate downstream through the intermediate tube 11 and into the left hand tube 10 toward the reactant. The rupturing of the diaphragm 13a is so timed with respect to the rupturing of the diaphragm 13, that the expansion fan will reach and cool the reactant gas after it has been at the reaction temperature for the desired length of time. In the nitrogen fixation process, the expansion waves arrive at the interface between the driver and reactant at about the time the reflected shock wave reaches the interface. The expansion waves pass through the high temperature and compressed reactant and operate to rapidly and uniformly cool the reactant, thereby fixing the nitrogen oxide (NO) formed at the elevated temperature previously established. The reflected shock wave continues to travel upstream or to the right as viewed in Fig. 1 and passes through the now opened diaphragm 13a and enters the vacuum section 12 wherein the energy of the shock wave is dissipated.

The expansion waves passing downstream or to the left as viewed in Fig. 1 also reflect from the closed end of the tube 11 and cool the reactant to a still lower temperature. This serves to insure that the final average velocity of the cooled gas will be low. In other words, the passage of the reflected shock wave brings the reactant gas essentially to rest. It is important to prevent the reactant gas from reaching a high velocity; otherwise the kinetic energy of the motion will be transferred to heat when the reactant is brought to rest and the product may be destroyed.

In this manner, it will be seen that the reactant is subjected to rapid and uniform heating and cooling, each in two stages. The reactant, specifically air, during compression is elevated to a sufficiently high temperature to permit the reaction between molecular oxygen and nitrogen to form NO which is thereafter rapidly and uniformly cooled to reduce such temperature in order to fix or prevent decomposition of the NO formed.

Thereafter, the NO can be collected within the bottle 68. This is accomplished by first evacuating the bottle 68 by closing the valve 71 and opening the valve 73 and connecting the line 70 to a suitable source of vacuum (not shown). Thereafter, the valve 73 is closed and the valves 71 and 72 are opened resulting in the NO being drawn into and collected within the bottle 68. After removing the line 69 from connection with the valve 72, hydrogen peroxide can be introduced into the bottle 68 through this line upon opening the valve 71 so as to react with the NO and form nitric acid ($HNO_3$).

It is believed that the principle of operation of the apparatus shown in Figs. 1–9 can best be understood by explaining the operation in connection with the diagram shown in Fig. 10 which may be taken as representative. In this diagram, time, as the ordinate, is plotted against the lengths of the high and low pressure chambers arranged end-to-end as the abscissa. The first diaphragm, analogous to the diaphragm 13, is ruptured at the point A on the diagram which is between the high and low pressure chambers, at zero time. This generates a shock wave 74 which propagates downstream to the left and through the low pressure chamber which contains the reactant. Upon striking the closed end of this low pressure chamber, the shock wave 75 is reflected upstream as the wave 75. Still referring to the diagram, the second diaphragm, analogous to the diaphragm 13a, is ruptured at the point B on the diagram which is at the right hand end of the high pressure chamber, actually between it and the vacuum section as previously described. The rupturing of the said second diaphragm is subsequent to that of the said first diaphragm, after a time interval represented on the ordinate or time scale by the vertical distance between O and point B, so as to establish the quenching expansion fan represented by the lines 76. The expansion waves 76 travel downstream and interact with the reflected shock wave 75, distorting each other as shown in the diagram. The expansion waves 76 also impinge against the closed end of the low pressure chamber and are reflected thereby and, in the diagram, the reflected expansion waves are represented by the lines 77. The interface between the driver gas and reactant gas is represented in the diagram by the broken line 78. The reflected shock wave 75 and reflected expansion waves 77 are dissipated upon entering the vacuum section which is not shown in the diagram.

The diagram shown in Fig. 10 is valid only for a restricted range of driver to reactant length ratios. If the driver or high pressure section is too short, the expansion wave 76 will reach the interface 78 before the reflected shock wave 75 and will cool part of the reactant gas before it has been properly heated. On the other hand, if the driver section is too long, the strong expansion waves 76 from the breaking of the second diaphragm will not overtake the weaker expansion waves 79 from the breaking of the first diaphragm, thus subjecting the reactant gas to a slow initial cooling rate which may not be sufficient to "freeze" the high temperature composition. A maximum pulse duration and cooling rate for a given shock tube geometry is obtained by breaking the second diaphragm just as the expansion wave generated by breaking the first diaphragm reaches it. It is to be noted that the reactant gas is heated and compressed at zero velocity.

The following is an example of a typical operation of the appaartus hereinabove described:

Length of high pressure section—6 feet.
Length of low pressure section—12 feet.
Gas in driver section—helium (medical grade) at a pressure of 325 pounds per square inch gauge (p. s. i. g.).
Gas in low pressure section—air at a pressure of 22 millimeters' mercury.
Pressure ratio between high and low pressure sections is 800.
Gas is vessel 43—helium (medical grade), rupturing the diaphragm 48 at a pressure of 500 p. s. i. g.
Diaphragm between high pressure and low pressure sections—.020 inch aluminum scored so that the wall thickness at the base of the grooves 28 is .0157 inch.
Diaphragm between high pressure and tank sections—same as above.
Diaphragm between vessel 43 and pipe 42—.020 inch aluminum, scored to provide at the base of the score lines a wall thickness of .013 inch.
Length of short delay tube—3$15/16$ inches.
Length of long delay tube—6 feet 10 inches.
Time delay between rupture of diaphragms 13 and 13a—1.9 milliseconds.

Gas was removed through line 69 and collected in the bottle 68, which was an evacuated 20 liter flask, for a period of three minutes. It was found that essentially all the NO produced was contained in the 20 liters of gas withdrawn. To the gas so removed and collected within the bottle 68 was added 10 cubic centimeters of 10% chemically pure hydrogen peroxide and the bottle was allowed to stand 24 hours. The reaction between the gas within the bottle and the hydrogen peroxide added thereto formed nitric acid ($HNO_3$) whose content was determined by titrating the acid with .01 normal potassium hydroxide (KOH). It was found that 26.11 cc. of the aforementioned KOH was required to neutralize the $HNO_3$. The measured yield of nitric oxide (NO) was determined to be 1.18% of the air originally confined within the low pressure section 10. This measured yield compared with a theoretical yield of 1.8%. The estimated reaction temperature within the low pressure section resulting from the action of the shock wave upon the air confined within the low pressure section was 2340°. The reaction time, or the time during which the air was heated by the shock wave and terminated by the action of a cooling expansion wave, was 3 milliseconds.

With the above apparatus operated at higher temperatures, yields of NO in excess of 3% were realized.

It will be evident to those skilled in the art that the method and apparatus herein described can be applied to a wide variety of gas phase reactions in which the desired product is produced at a high temperature and can be preserved by rapid cooling.

We claim:

1. Apparatus for carrying out gas phase reactions, comprising a high pressure chamber adapted to contain a driver gas, a low pressure chamber adapted to contain a reactant gas and arranged at one end of said high pressure chamber, a third chamber adapted to be placed under vacuum and arranged at the other end of said high pressure chamber, a first rupturable diaphragm separating said low and high pressure chambers, a second rupturable diaphragm separating said high pressure and third chambers, independent mechanical means arranged to rupture each of said diaphragms, and means arranged to actuate said first diaphragm rupturing means before said second diaphragm rupturing means and at a predetermined time interval.

2. Apparatus for carrying out gas phase reactions, comprising a low pressure chamber adapted to contain a reactant gas, a high pressure chamber adapted to contain a driver gas, a third chamber adapted to be placed under vacuum, a first rupturable diaphragm separating said low and high pressure chambers, a second rupturable diaphragm separating said high pressure and third chambers, independent means arranged to rupture each of said diaphragms, and means arranged to actuate said first diaphragm rupturing means before said second diaphragm rupturing means and at a predetermined time interval, said actuating means including a tube operatively connected at one end to said first diaphragm rupturing means, a longer tube operatively connected at one end to said second diaphragm rupturing means and means for generating a shock wave at the other ends of said tubes whereby a part of said shock wave passes through each of said tubes.

3. Apparatus for carrying out gas phase reactions, comprising a low pressure chamber adapted to contain a reactant gas, a high pressure chamber adapted to contain a driver gas, a third chamber adapted to be placed under vacuum, a first rupturable diaphragm separating said low and high pressure chambers, a second rupturable diaphragm separating said high pressure and third chambers, each of said diaphragms being scored to facilitate its rupture, a first plunger operatively associated with said first diaphragm, a second plunger operatively associated with said second diaphragm, each of said plungers being adapted to be actuated so as to puncture its respective diaphragm, and means arranged to actuate said first plunger before said second plunger and at a predetermined time interval.

4. The method of carrying out reactions which require a high temperature to promote the reaction and rapid cooling to preserve the reaction product, which method comprises confining a body of reactant gas having an end face, directing a body of pressurized driver gas thrustingly against substantially the entire cross-sectional area of said end face so as to form a movable interface region between the two bodies of gases and to generate a shock wave which propagates through the reactant gas in advance of the interface region, the reactant gas between said shock wave and interface region being compressed and heated, and controllably generating an expansion wave in the driver gas at a place remote from the moving interface region so that said expansion wave propagates first through the driver gas and thence through the interface region and into and through the heated reactant gas whereby the latter is rapidly cooled by expanding against and transferring energy to the driver gas.

5. The method of carrying out reactions which require a high temperature to promote the reaction and rapid cooling to preserve the reaction product, which method comprises confining a body of reactant gas having an end face, directing a body of pressurized driver gas thrustingly against substantially the entire cross-sectional area of said end face so as to form a movable interface region between the two bodies of gases and to generate a shock wave which propagates through the reactant gas in advance of the interface region, the reactant gas between said shock wave and interface region being compressed and heated, and controllably generating an expansion wave in the driver gas at a place remote from the moving interface region so that said expansion wave propagates first through the driver gas and thence through the interface region and into and through the heated reactant gas whereby the latter is rapidly cooled by expanding against and transferring energy to the driver gas, the generation of said expansion wave being so timed with respect to the generation of said shock wave that said expansion wave does not overtake said shock wave before the latter has passed completely through the reactant gas.

6. The method of carrying out reactions which require a high temperature to promote the reaction and rapid cooling to preserve the reaction product, which method comprises confining a body of reactant gas having an end face, directing a body of pressurized driver gas thrustingly against substantially the entire cross-sectional area of said end face so as to form a movable interface region between the two bodies of gases and to generate a shock wave which propagates through the reactant gas in advance of the interface region, the reactant gas between said shock wave and interface region being compressed and heated, controllably generating an expansion wave in the driver gas at a place remote from the moving interface region so that said expansion wave propagates first through the driver gas and thence through the interface region and into and through the heated reactant gas whereby the latter is rapidly cooled by expanding against and transferring energy to the driver gas, and dissipating the shock and expansion waves after they leave the body of reactant gas.

7. The method of carrying out reactions which require a high temperature to promote the reaction and rapid cooling to preserve the reaction product, which method comprises confining a body of reactant gas having an end face, directing a body of pressurized driver gas thrustingly against substantially the entire cross-sectional area of said end face so as to form a movable interface region between the two bodies of gases and to generate a shock wave which propagates through the reactant gas in advance of the interface region, the reactant gas between said shock wave and interface region being compressed and heated, controllably generating an expansion wave in the driver gas at a place remote from the moving interface region so that said expansion wave propagates first through the driver gas and thence through the interface region and into and through the heated reactant gas whereby the latter is rapidly cooled by expanding against and transferring energy to the driver gas, the generation of said expansion wave being so timed with respect to the generation of said shock wave that said expansion wave does not overtake said shock wave before the latter has passed completely through the body of reactant gas, and dissipating the shock and expansion waves after they leave the body of reactant gas.

8. The method of carrying out reactions which require a high temperature to promote the reaction and rapid cooling to preserve the reaction product, which method comprises confining a body of reactant gas having an end face, directing a body of pressurized driver gas thrustingly against substantially the entire cross-sectional area of said end face so as to form a movable interface region between the two bodies of gases and to generate a shock wave which propagates through the reactant gas in advance of the interface region, the reactant gas between said shock wave and interface region being compressed and heated, reflecting said shock wave so as to pass again through the body of partially heated reactant gas to raise the temperature thereof to a higher level, controllably generating an expansion wave in the driver gas at a place remote from the moving interface region so that said expansion wave propagates first through the driver gas and thence through the interface region and into and through the heated reactant gas whereby the latter is rapidly cooled by expanding against and transferring energy to the driver gas, the generation of said expansion wave being so timed with respect to the generation of said shock wave that said expansion wave arrives at said interface region in a predetermined time relationship to said reflected shock wave leaving said interface region, and dissipating said reflected shock wave after it leaves the body of reactant gas.

9. The method of carrying out reactions which require a high temperature to promote the reaction and rapid cooling to preserve the reaction product, which method comprises confining a body of reactant gas having an end face, directing a body of pressurized driver gas thrustingly against substantially the entire cross-sectional area of said end face so as to form a movable interface region between the two bodies of gases and to generate a shock wave which propagates through the reactant gas in advance of the interface region, the reactant gas between said shock wave and interface region being compressed and heated, reflecting said shock wave so as to pass again through the body of partially heated reactant gas to raise the temperature thereof to a higher level, controllably generating an expansion wave in the driver gas at a place remote from the moving interface region so that said expansion wave propagates first through the driver gas and thence through the interface region and into and through the heated reactant gas whereby the latter is rapidly cooled by expanding against and transferring energy to the driver gas, and reflecting said expansion wave so as to pass again through the body of partially cooled reactant gas to further cool the same.

10. The method of carrying out reactions which require a high temperature to promote the reaction and rapid cooling to preserve the reaction product, which method comprises confining a body of reactant gas having an end face, directing a body of pressurized driver gas thrustingly against substantially the entire cross-sectional area of said end face so as to form a movable interface region between the two bodies of gases and to generate a shock wave which propagates through the reactant gas in advance of the interface region, the reactant gas between said shock wave and interface region being compressed and heated, reflecting said shock wave so as to pass again through the body of partially heated reactant gas to raise the temperature thereof to a higher level, controllably generating an expansion wave in the driver gas at a place remote from the moving interface region so that said expansion wave propagates first through the driver gas and thence through the interface region and into and through the heated reactant gas whereby the latter is rapidly cooled by expanding against and transferring energy to the driver gas, and reflecting said expansion wave so as to pass again through the body of partially cooled reactant gas to further cool the same, the generation of said expansion wave being so timed with respect to the generation of said shock wave that said expansion wave arrives at said interface region a predetermined time after said reflected shock wave leaves said interface region.

11. The method of carrying out reactions which require a high temperature to promote the reaction and rapid cooling to preserve the reaction product, which method comprises confining a body of reactant gas having an end face, directing a body of pressurized driver gas thrustingly against substantially the entire cross-sectional area of said end face so as to form a movable interface region between the two bodies of gases and to generate a shock wave which propagates through the reactant gas in advance of the interface region, the reactant gas between said shock wave and interface region being compressed and heated, reflecting said shock wave so as to pass again through the body of partially heated reactant gas to raise the temperature thereof to a higher level, controllably generating an expansion wave in the driver gas at a place remote from the moving interface region so that said expansion wave propagates first through the driver gas and thence through the interface region and into and through the heated reactant gas whereby the latter is rapidly cooled by expanding against and transferring energy to the driver gas, reflecting said expansion wave so as to pass again through the body of partially cooled reactant gas to further cool the same, and dissipating said reflected shock and reflected expansion waves after they leave the body of processed reactant gas.

12. The method of carrying out reactions which require a high temperature to promote the reaction and rapid cooling to preserve the reaction product, which method comprises confining a body of reactant gas having an end face, directing a body of pressurized driver gas thrustingly against substantially the entire cross-sectional area of said end face so as to form a movable interface region between the two bodies of gases and to generate a shock wave which propagates through the reactant gas in advance of the interface region, the reactant gas between said shock wave and interface region being compressed and heated, reflecting said shock wave so as to pass again through the body of partially heated reactant gas to raise the temperature thereof to a higher level, controllably generating an expansion wave in the driver gas at a place remote from the moving interface region so that said expansion wave propagates first through the driver gas and thence through the interface region and into and through the heated reactant gas whereby the latter is rapidly cooled by expanding against and transferring energy to the driver gas, reflecting said expansion wave so as to pass again through the body of partially cooled reactant gas to further cool the same, the generation of said expansion wave being so timed with respect to the generation of said shock wave that said expansion wave arrives at said interface region a predetermined time after said reflected shock wave leaves said interface region, and dissipating said reflected shock and reflected expansion waves after they leave the body of processed reactant gas.

13. The method of carrying out reactions which require a high temperature to promote the reaction and rapid cooling to preserve the reaction product, which method comprises confining a body of reactant gas and an adjacent body of a driver gas which is inert to the reaction to be promoted, the body of driver gas being confined at a higher pressure than the body of reactant gas, rapidly bringing one end of the body of driver gas into thrusting engagement with the adjacent end of the body of reactant gas across substantially the entire cross-sectional area thereof so as to generate a shock wave which propagates through the reactant gas in advance of the movable interface region formed between the two bodies of gases, reflecting said shock wave so as to pass again through the body of reactant gas, the effect of the shock and its reflected wave upon the reactant gas being to elevate its temperature sufficiently to form the reaction product, controllably rapidly reducing the pressure of the driver gas across substantially the full cross-sectional area thereof at a place remote from the moving interface region so as to generate an expansion wave which propagates first through the driver gas and thence through the interface region and into and through the heated reactant gas, arriving at such interface region at about the time said reflected shock wave leaves the body of heated reactant gas, the effect of the expansion wave being to rapidly expand and cool the gas through which it has passed whereby the reaction product is preserved, and dissipating said reflected shock wave after it leaves the body of heated reactant gas.

14. The method of carrying out reactions which require a high temperature to promote the reaction and rapid cooling to preserve the reaction product, which method comprises confining a body of reactant gas and an adjacent body of a driver gas which is inert to the reaction to be promoted, the body of driver gas being confined at a higher pressure than the body of reactant gas, rapidly bringing one end of the body of driver gas into thrusting engagement with the adjacent end of the body of reactant gas across substantially the entire cross-sectional area thereof so as to generate a shock wave which propagates through the reactant gas in advance of the movable interface region formed between the two bodies of gases, reflecting said shock wave so as to pass again through the body of reactant gas, the effect of the shock and its reflected wave upon the reactant gas being to elevate its temperature sufficiently to form the reaction product, controllably rapidly reducing the pressure of the driver gas across substantially the full cross-sectional area thereof at a place remote from the moving interface region so as to generate an expansion wave which propagates first through the driver gas and thence through the interface region and into and through the heated reactant gas, arriving at such interface region at about the time said reflected shock wave leaves the body of heated reactant gas, reflecting said expansion wave so as to pass again through the reactant gas, the effect of the expansion and its reflected wave upon the heated reactant gas being to rapidly expand and cool the same and preserve said reaction product, and dissipating said reflected shock and expansion waves after they leave the body of processed reactant gas.

References Cited in the file of this patent

UNITED STATES PATENTS

| 1,283,112 | Drawe | Oct. 29, 1918 |
| 2,516,934 | Weaver | Aug. 1, 1950 |
| 2,690,960 | Kistiakowsky | Oct. 5, 1954 |

OTHER REFERENCES

Lessing: "Scientific American," vol. 188, No. 5, May 1953, pages 29–35.